(No Model.)

F. SCHWALM.
ANIMAL POKE.

No. 361,839. Patented Apr. 26, 1887.

WITNESSES:
H. McArdle,
C. Sedgwick

INVENTOR:
F. Schwalm
BY Munn & Co.
ATTORNEYS.

UNITED STATES PATENT OFFICE.

FRANCIS SCHWALM, OF FORT SMITH, ARKANSAS.

ANIMAL-POKE.

SPECIFICATION forming part of Letters Patent No. 361,839, dated April 26, 1887.

Application filed July 30, 1886. Serial No. 209,537. (No model.)

*To all whom it may concern:*

Be it known that I, FRANCIS SCHWALM, of Fort Smith, in the county of Sebastian and State of Arkansas, have invented a new and Improved Animal-Poke, of which the following is a full, clear, and exact description.

My invention relates to animal-pokes so arranged that while the animal in connection with which the poke is employed is free to graze, it will be impossible for the animal to move forward while its head is erect.

Reference is to be had to the accompanying drawings, forming a part of this specification, in which similar figures of reference indicate corresponding parts in both views.

Figure 1:
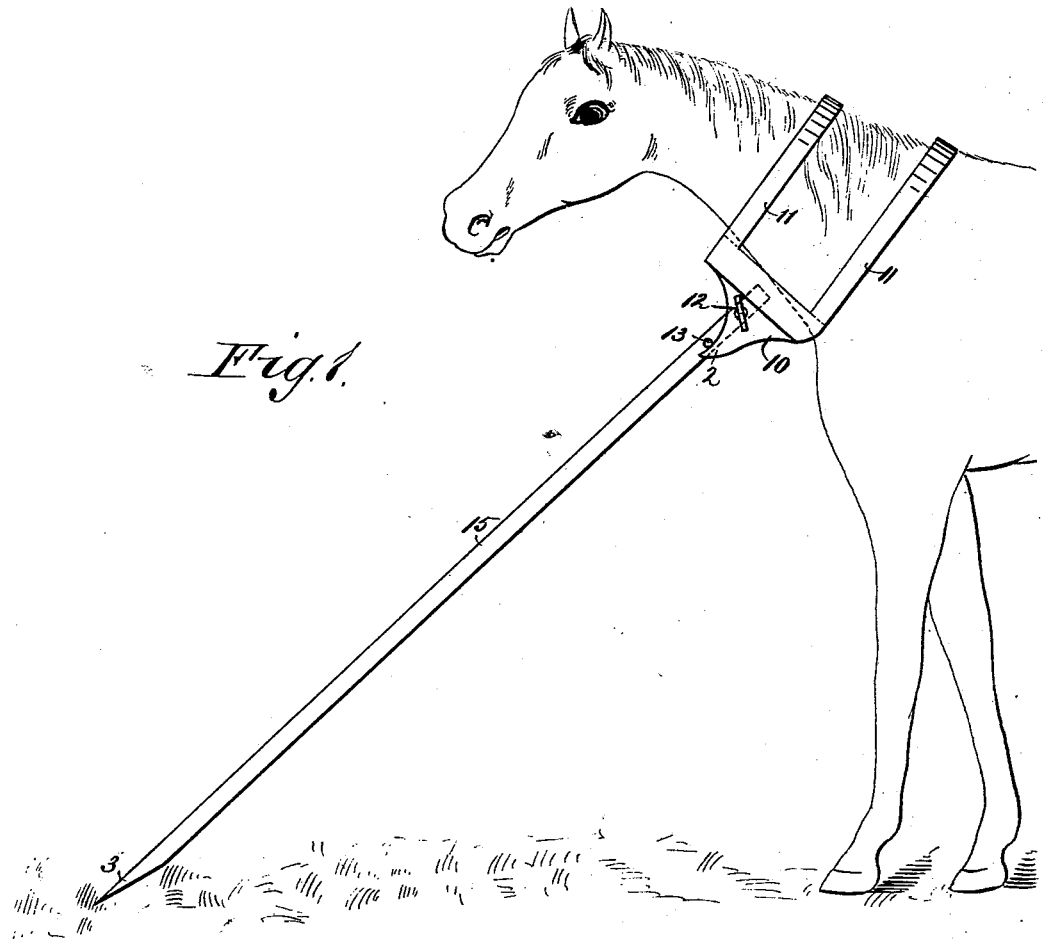
Figure 2:
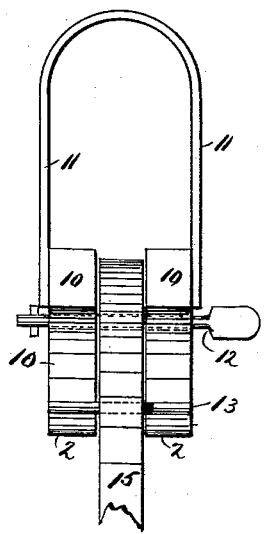

Figure 1 is a side view of my improved form of animal-poke, the same being represented as applied to a horse. Fig. 2 is a view of the forward side of the poke, the downwardly-extending pointed rod being broken away.

In constructing such a poke as the one illustrated in the drawings above referred to, I provide two side blocks, 10, to which there are secured straps 11, said straps being arranged to encircle the neck of the animal in connection with which the poke is to be employed. Between the blocks 10 there is pivotally mounted a forwardly and downwardly extending rod, 15, connection between the blocks and the rod being established by means of the pivot pin or bolt 12, which is passed through the blocks and through a proper aperture formed in the rod.

In order that the rod 15 may project forward at a proper angle, I arrange a limit-pin, 13, in connection with the rod, which said limit-pin rests against forwardly-extending arms 2, that are made integral with the blocks 10. The lower end of the rod 15 is pointed, as shown at 3, the point being formed by beveling or rounding off the lower end from the rear side of the rod.

In applying the device described to an animal the straps 11 are passed about the animal's neck and the device adjusted to about the position in which it is shown in Fig. 1, and when so adjusted the animal will be held against any forward movement while its head is erect, as the pointed end of the rod would enter the ground, but in the act of grazing the head is lowered, which will cause said rod to assume a more nearly horizontal position, thus raising the point from the ground and allowing the beveled end of the rod to slide along the ground. The animal can back or turn freely at all times, but cannot move forward nor jump fences.

This device will be found extremely convenient for the purpose of preventing domestic or other animals from straying from their pastures; and while being exceedingly useful and well adapted for the purpose for which it is intended, the poke may be cheaply made, and will be found to be extremely durable.

Having thus fully described my invention, I claim as new and desire to secure by Letters Patent—

An animal-poke consisting of the side blocks, 10, having forwardly-extending arms 2 2 and neck-straps 11, the rod 15, beveled at the lower edge of its forward end and having a limit-pin, 13, near its upper end, resting against the forward side of the arms, and the pivot-bolt 12, extending through the blocks and the upper end of the rod above the limit-pin, the forward end of the rod being adapted to rest on the ground when the head of the animal is erect or raised from a grazing position, to prevent forward movement, substantially as set forth.

FRANCIS SCHWALM.

Witnesses:
JAMES STEVENS,
C. T. BREEDLOVE.